United States Patent [19]
Wagenhofer

[11] 3,968,537
[45] July 13, 1976

[54] WIPING BLADE DEVICE FOR TRUCK REAR VIEW MIRRORS

[75] Inventor: John Joseph Wagenhofer, Chicago, Ill.

[73] Assignee: Lawrence Peska Associates, Inc., New York, N.Y. ; a part interest

[22] Filed: Sept. 25, 1974

[21] Appl. No.: 509,044

[52] U.S. Cl. .............................. 15/250.29; 15/250 B
[51] Int. Cl.² ........................ B60S 1/24; B60S 1/08
[58] Field of Search 15/250.29, 250.3, 250.24–250.26, 15/22 A, 250.01–250.04, 250 B; 74/44

[56] References Cited
UNITED STATES PATENTS

| | | | |
|---|---|---|---|
| 2,253,029 | 8/1941 | Hart | 15/250.29 X |
| 3,667,082 | 6/1972 | Hoyler | 15/250.29 |
| 3,855,661 | 12/1974 | Prince | 15/250.26 |
| 3,855,662 | 12/1974 | Fortin | 15/250.29 |

FOREIGN PATENTS OR APPLICATIONS

| | | | |
|---|---|---|---|
| 601,905 | 3/1926 | France | 15/250.30 |

*Primary Examiner*—Peter Feldman

[57] ABSTRACT

A motorized wiping device for cleaning rear and side view mirrors of trucks, buses, trailers, and other heavy vehicles, in which the mirror is mounted externally on the vehicle. Such mirrors being normally wide and high, a rain or snow storm or fog can render them unusable, and the invention is intended to wipe them off as needed. A motor in a housing drives a wiper blade movable over the mirror, with a reciprocating coupling linkage from the motor to the wiper blade, and either a separate battery may be in the housing, or direct connection be made to the vehicle battery controlled by the operator.

2 Claims, 4 Drawing Figures

WIPING BLADE DEVICE FOR TRUCK REAR VIEW MIRRORS

This invention relates to improvements in wiping blade devices for truck rear view mirrors.

An object of the invention is to provide a novel and improved wiping device for cleaning off the rear view mirrors of trucks, trailer trucks and the like vehicles.

Another object of the invention is to provide a novel and improved wiping blade device for cleaning off large rear view mirrors, of trucks, trailers and the like, in which the wiper is run by electrical or electromagnetic drive means controlled from within the truck to enable the driver to see to change lanes during rain or snow storms, and to keep the mirror clean of moisture so the driver can see to back up the truck or trailer as needed, especially in tight parking spaces.

A further object of the invention is to provide a novel and improved rear view mirror cleaning and wiping device in which there is a wiper blade supported for moving over the entire area of the mirror, for keeping it cleaned off, without the need for the operator of the truck to manually move the wiper.

Still another object of the invention is to provide a novel and improved rear view mirror cleaning and wiping device of the type described, which is simple in design, made up of relatively few parts, and which can be adapted to use with most types of truck and trailer drive mirrors without radical structural alterations, and without substantial modification of the construction of the customary rear view mirrors so essential to safe and convenient driving of heavy trucks and trailers.

Still a further object of the invention is to provide a novel and improved side and rear view mirror cleaning and wiping device which can be made at low cost, by hand or mass production methods, and which will be durable and long lived in active use on the road in all types of climatic conditions.

The above and other objects and advantages of the invention will become apparent from the following description of a preferred embodiment thereof, as illustrated in the accompanying drawings, forming a part hereof.

Figure 4:
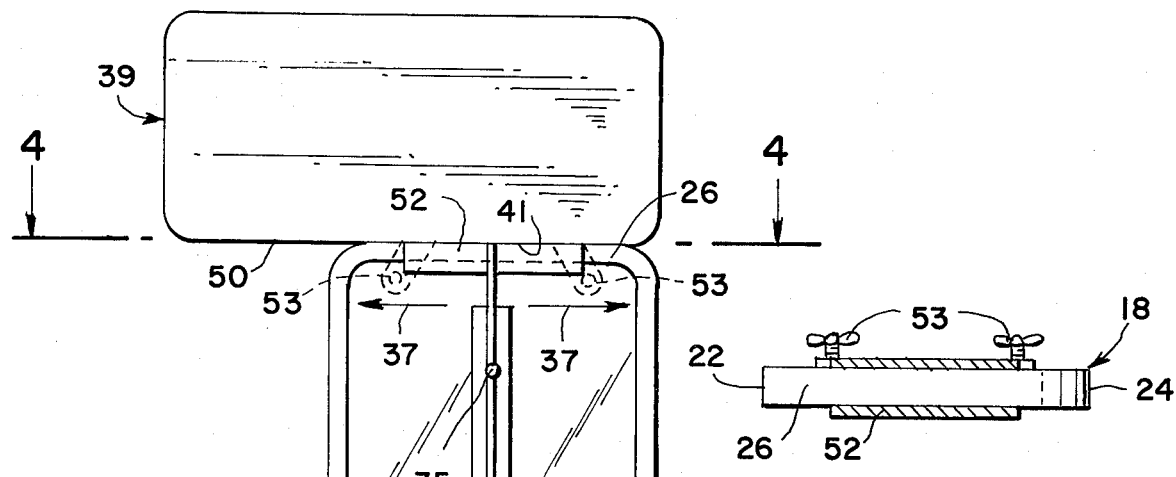
FIG. 4 is a fragmentary sectional detail plan view taken substantially on Plane 4—4 of FIG. 1.
Figure 1:
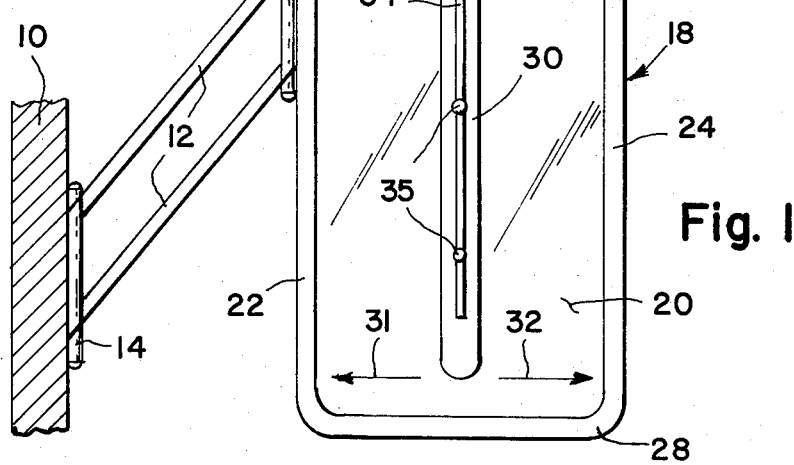
FIG. 1 is a fragmentary side elevational view of a side and rear view mirror of a truck, as it would appear to the driver of the truck, with wiper in position thereon.

In the use of large trucks, buses, trailer trucks, transitmix types of cement mixers, garbage and refuse trucks, and other vehicles, the rear and side view mirrors are made quite large in area to enable the driver to maneuver his vehicle not only on the highway, but also in narrow city streets and from and to loading platforms. For this purpose, a high degree of skill is required by the driver which can only be appreciated by those who are or have been such truck drivers, for without the fine control by the driver, as seen with his rear and side view mirrors, there would be many more accidents and damages to vehicles and buildings.

This situation is compounded when there is bad weather, such as snow, rain, sleet and foggy conditions, where the rear and side view mirrors are clouded up with moisture condensate so the driver cannot see anything at all frequently, and must reach out with a rag to wipe off his mirrors. The present invention is intended to aid the driver, by furnishing a bladed wiper to wipe off his protective mirrors under his control from inside the cab of the vehicle. A wiper blade is carried on a support which is moved by motor drive back and forth over the mirror surface to wipe it off constantly.

In order to understand clearly the nature of the invention, and the best means for carrying it out, reference may be had to the drawings, in which like numerals denote similar parts throughout the several views.

As shown, there is a truck body or side cowl portion 10, with bracket rods 12 pivotally engaged at hinges 14 and 16 for supporting the side and rear view mirror 18 to enable the driver to guide his vehicle. The mirror 18 has a mirror plate 20, with side rails 22 and 24 and top and bottom rails 26 and 28 to which the hinges 16 are attached so that the mirror may be swung about the vertical axis of the hinges, to guide the driver of the truck.

Because of the wide visual area the mirror must have a rather wide and high viewing extent, and where the atmosphere changes with the seasons, a high degree of moisture or frost or sleet may deposit on the mirror, to really block all vision by the driver through the mirror. For correcting this condition, a rubber, rubber-like, or plastic wiper blade 30 is provided to reciprocate in the directions of the arrows 31 and 32, back and forth about the vertical axis of the blade 30. The wiper blade is supported on the wiper blade stem 34, and may be secured thereon by fastenings or rivets 35 at spaced intervals therealong.

Figure 2:
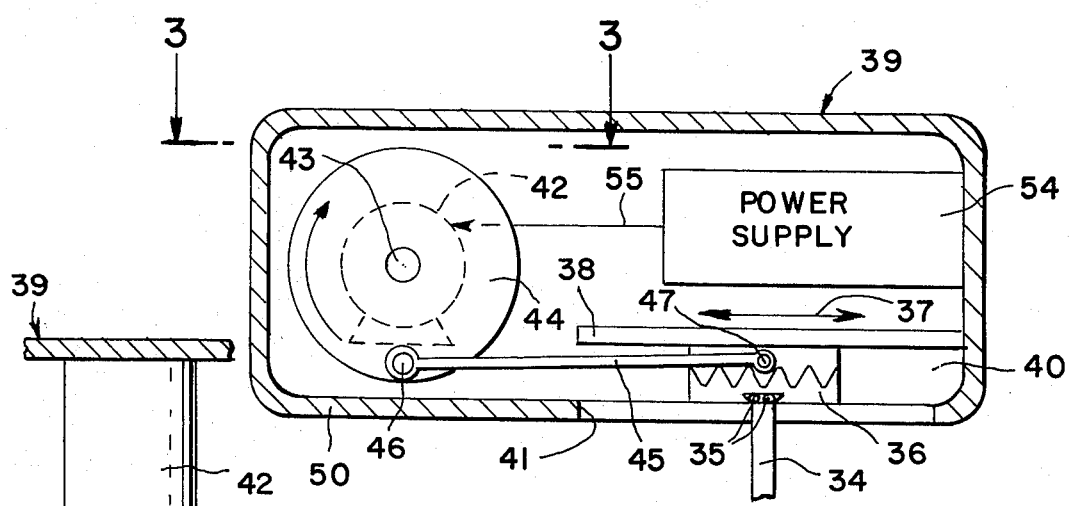
FIG. 2 is a sectional plan view of the interior of the motor housing.
Figure 3:
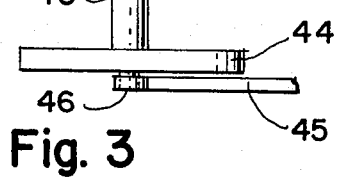
FIG. 3 is an elevational view taken substantially on Plane 3—3 of FIG. 2.

To move the wiper blade 30 left and rightwards to keep the rearview and sideview mirrors cleaned off, the wiper blade stem 34 is engaged by rivets 35 with a toothed slidable base member 36 and movable in the directions of the arrows 37 to sweep across the mirror surface to keep it cleaned off. As seen in FIG. 2, the guide plate 38 secured in the drive housing 39 keeps the slidable base member in the space 40 between it and the wall 41.

An electric motor 42 also mounted inside the drive housing, has its drive shaft 43 secured to the rotating cam drive wheel 44 for rotation therewith, and a connecting rod, drive arm or link lever 45 is connected at one end to wheel 44 by the wrist pin 46, and at its other end to the pin 47 carried by the slidable member 36. As the wheel 44 rotates it is apparent that the cranking action reciprocates the member 36 back and forth to wipe the mirror off as needed.

To allow for accurate positioning and adjustment of the mirror 18, the bottom wall 50 of the drive motor housing has a depending channel 52 between the flanges of which the mirror fits and with wing nuts 53 and clamps as seen in FIG. 4, to allow for sidewise adjustment of the parts. The power supply 54 may be either a self contained battery connected by wires 55 to the motor 42 with a suitable switch for on and off positions, or may be connected by wires to the car battery and controlled by the driver from the dashboard of the truck.

As the larger trucks and trailers have these large rear and side view mirrors on both sides of the cab, it is understood that each of the mirrors may preferably be equipped with such wipers.

Although the invention has been described in specific terms, it is understood that various changes may be made in size, shape, materials and arrangement without departing from the spirit and scope of the invention as claimed.

Having herein described the invention, what is claimed as new is:

1. A detachably mounted wiping device for cleaning off rear view and side view mirrors of vehicles in which the mirrors are supported outwardly from the vehicles and are of substantial surface area expanse, said device comprising wiper support stem means, for carrying a wiper blade means, main wiper housing means, motor means in said main wiper housing means for driving said wiper support stem means, reciprocating coupling means for connecting said motor means to said wiper support stem means for reciprocally moving said wiper blade means back and forth in a horizontal direction over said mirrors, said main wiper housing means comprising a top wall, a bottom wall, two end walls, and two side walls defining an enclosed main housing chamber for blocking entrance of rain and snow into said chamber, motor mounting means in said chamber for supporting said motor means, said chamber having a narrow elongated opening formed in said bottom wall thereof for extension therethrough of said wiper support stem means, said motor means comprising rotatable drive shaft means, cam drive wheel means carried by said drive shaft means for rotation therewith, said reciprocating coupling means comprising wrist pin means carried on said cam drive wheel means for rotation therewith, sliding bar means carried by said wiper blade stem means, connecting rod means coupling said wrist pin means with said sliding bar means for causing said wiper blade stem means to undergo reciprocal wiping motion upon rotation of said drive shaft of said motor means, guide plate means supported in said main chamber and mounted parallel to said bottom wall said sliding bar means being horizontally guided within the space between said guide plate, said bottom wall, and said slide walls to provide reciprocating movement of the stem and wiper blade in a direction parallel to the surface of said mirror and for maintaining said blade in engagement with said mirror surface, channel rail means carried by said bottom wall of said housing means for engaging an upper top edge margin portion of said mirror, and releasable clamp means on said channel rail means for holding said mirror in adjustable relationship to said housing means for providing lateral position adjustment of said housing with respect to said mirror.

2. The construction of claim 1, and wherein said clamp means comprises a plurality of clamps and wing screws and nuts for manual clamping and adjustment action.

* * * * *